May 1, 1951  C. E. TACK ET AL  2,550,733
CAR TRUCK BRAKE ARRANGEMENT
Filed Aug. 24, 1946  2 Sheets-Sheet 1

INVENTORS
CARL E. TACK
FRED E. BACHMAN
BY
ATTORNEY

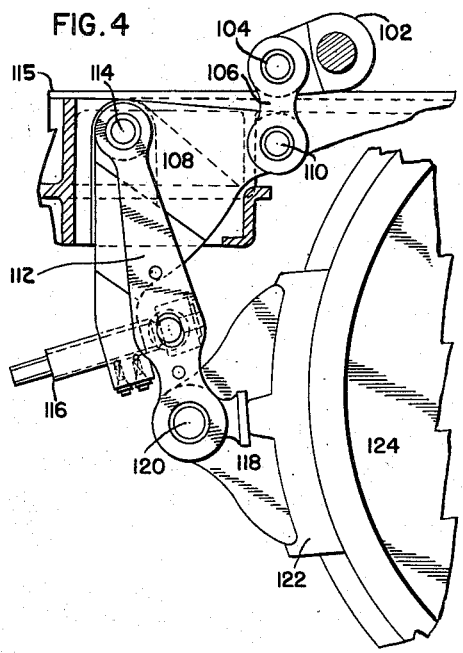
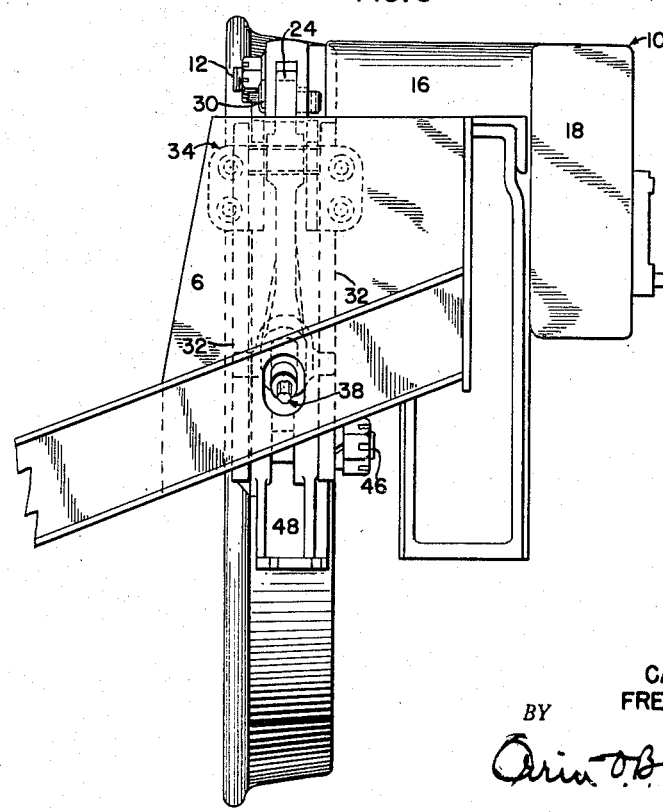

Patented May 1, 1951

2,550,733

UNITED STATES PATENT OFFICE 2,550,733

CAR TRUCK BRAKE ARRANGEMENT

Carl E. Tack and Fred E. Bachman, Chicago, Ill., assignors to American Steel Foundries, Chicago, Ill., a corporation of New Jersey Application August 24, 1946, Serial No. 692,794

10 Claims. (Cl. 188—56)

Our invention relates to a brake arrangement for railway car trucks.

One object of our invention is to provide a simple, durable and efficient brake rigging that is composed of relatively few parts which may be easily assembled and disassembled.

Another object of our invention is to design a novel brake rigging such as may provide a more direct and readily adjustable connection between the actuating means and the brake shoe.

A further object of our invention is to provide a direct linkage between the power means and the brake shoe-carrying means, said linkage comprising a dead bell crank lever fulcrumed on the truck frame and having one leg thereof pivotally connected to a crank on the power means and having its other leg positioned between and adjustably connected to said shoe-carrying means comprising a pair of hangers pivoted with said lever on a common supporting fulcrum, said hangers carrying the brake head and shoe assembly for frictional engagement with the periphery of the wheel.

Figure 1:
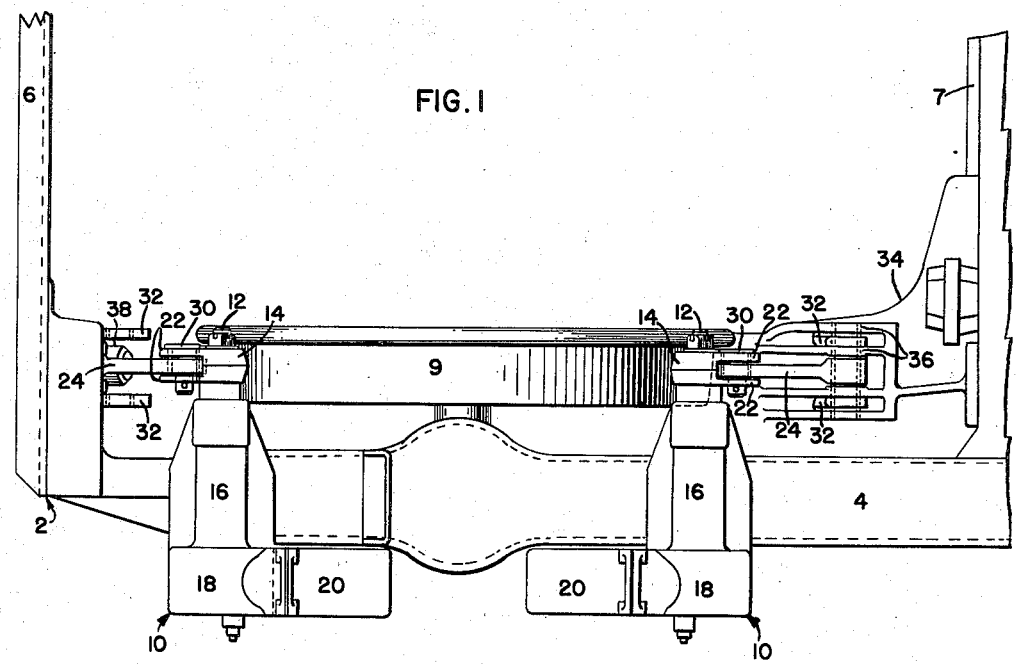
Figure 2:
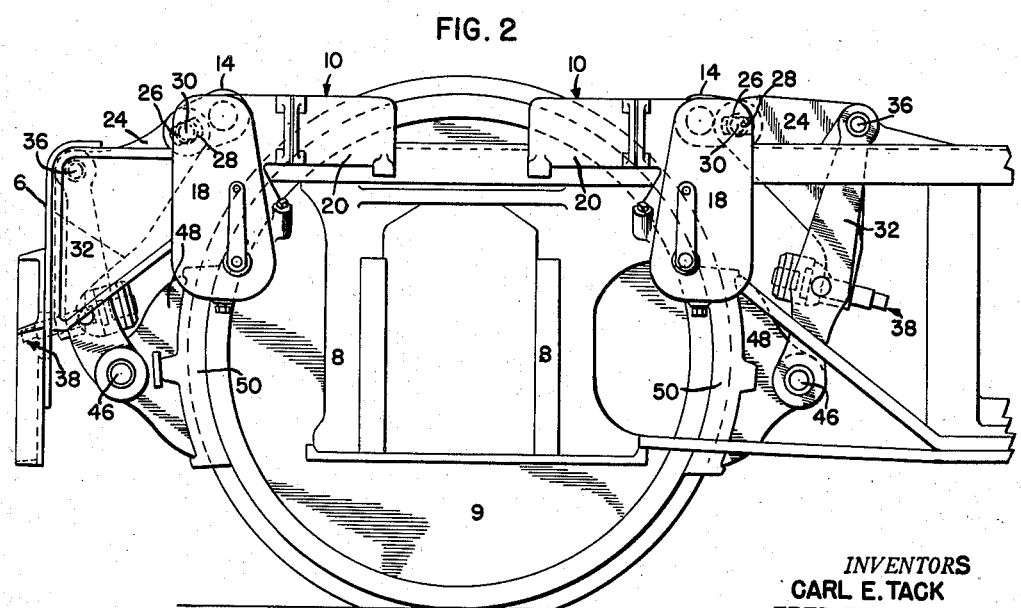

These and other objects of our invention are accomplished by means of the arrangement disclosed on the accompanying sheets of drawings in which Figure 1 is a top plan view of a car truck embodying our invention, only one quarter of the truck being shown as it is bisymmetrical, Figure 2 being a side elevation thereof, Figure 3 being a fragmentary end view taken from the left of the structure as shown in Figure 2, and Figure 4 is a fragmentary side elevation of a modification of the brake arrangement illustrated in Figure 2 and showing the additional linkage between the bell crank lever and the actuating means.

Describing our invention in detail, the truck 2 is of conventional design and comprises the side rails 4, 4, the end rails 6, 6 and the spaced transoms 7, 7 between which a load-carrying member or bolster (not shown) may be suspended in the usual manner. Each side rail at each end thereof is formed with a pair of spaced pedestal legs 8, 8 adapted for the reception therebetween of a journal box (not shown) formed and arranged for accommodation of the adjacent end of the associated wheel and axle assembly 9.

Mounted upon the side rails 4, 4 are the brake actuating means or braking mechanisms, generally designated 10, associated with each side of each wheel.

It may be observed that each braking mechanism is identical although oppositely arranged for each side of each wheel, and that both of these mechanisms are arranged to be actuated simultaneously to clasp the wheel therebetween.

The actuating means 10 comprises a shaft 12 keyed in any conventional manner to the crank 14. The shaft 12 is connected through a sleeve 16 to the gear box 18 operatively associated with any conventional motor means 20, such as, for example, an air cylinder device. The means for rotating the shaft are no part of the present invention and are therefore not described in detail.

The crank 14 has the integral radially extending arms 22, 22 between which is received one end of the dead operating bell crank or elbow lever 24 having the nonround opening 26 which is aligned with the round openings 28, 28 in the arms 22, 22. Extending through these openings is a pin 30 providing a sliding pivotal connection between the lever and the crank. The other end of the lever 24 is positioned between a pair of spaced parallel hangers or hanger levers 32, 32, said lever and hangers being pivotally hung on a supporting bracket or fulcrum 34 as at 36 on the truck frame.

In the lower end of the lever 24 is mounted a manually operated slack adjuster, generally designated 38 and providing an adjustable connection between the lever and the hangers for varying the relative position of said lever with respect to said hangers.

Pivoted on the hangers 32, 32 as at 46 is a brake head 48 carrying the shoe 50 for frictional engagement with the periphery of the wheel.

Referring now to the modification shown in Figure 4, the crank 102 is keyed to the actuating means (not shown) in a manner hereinbefore described in connection with the previous modification and is pivotally connected as at 104 to one end of the link 106 which is at its other end pivoted to one leg of the bell crank or elbow lever 108 as at 110.

The other leg of the lever 108 is positioned between a pair of spaced parallel hangers 112, 112, said lever and hangers being pivotally supported as in the previous modification on a common fulcrum as at 114 on the truck frame 115. Operatively associated with said last-mentioned leg of said lever 108 is a slack adjuster 116 providing an adjustable connection between the lever 108 and the hanger 112.

The brake head 118 is pivoted on the hangers 112, 112 as at 120 and carries a shoe 122 for braking engagement with the wheel 124.

Although we have illustrated our invention in connection with a pair of hangers, a single bifurcated hanger could be substituted for said pairs of hangers as will be apparent to those skilled in the art.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a railway car truck comprising a truck frame and a supporting wheel and axle assembly, a plurality of independent braking systems for each wheel, each system comprising an element pivotally connected to the frame, friction means carried by said element for braking engagement with a surface of said assembly, a lever pivoted intermediate its ends to said element at its point of connection with said frame, said lever having one leg thereof adjustably connected to said element, and actuating means operatively associated with the other leg of said lever, said element and the legs of said lever being formed and arranged to disengage the friction means from said surface by gravity when said actuating means are inactivated.

2. In a brake arrangement for a railway car truck, a truck frame, a supporting wheel and axle assembly comprising a wheel, a pair of hangers lying in the radial plane of said wheel and fulcrumed at their upper ends to said frame adjacent said wheel and carrying braking means for braking engagement with a surface of said wheel, a bell crank lever pivoted on the fulcrum supporting said hanger and having one leg thereof between said hangers, means adjustably connecting said leg of said lever to said hangers intermediate their ends, and actuating means operatively connected to the other leg of said lever, said other leg extending toward said wheel and serving to release the braking means from said wheel by gravity.

3. In a brake arrangement, a vehicle frame, a supporting wheel and axle assembly, a pair of spaced parallel hangers pivotally supported at their upper ends on the frame, friction means carried by said hangers for braking engagement with a surface of said assembly, a bell crank lever between said hangers and pivoted with said hangers at their point of support and having one leg thereof adjustably connected to said hangers intermediate their ends, power means mounted on said frame, and a upwardly extending link pivotally connected to said power means at one end and pivoted elsewhere to the other leg of said bell crank lever, said other leg extending generally horizontally and with said link to provide an auxiliary release through gravity for disengaging said friction means from said assembly upon deactuation of the power means.

4. In a brake arrangement for a railway car truck having a frame including a side rail, a wheel and axle assembly, and brake means for the assembly comprising a pair of spaced hangers disposed in radial alignment with a wheel of said assembly and pivoted at their upper ends from the side rail on a substantially horizontal axis, a brake head disposed between the hangers and pivoted on a substantially horizontal pivot to the lower ends of said hangers, a brake shoe carried by the head for engagement with the tread of said wheel, a bell-crank lever disposed between said levers above the head and pivoted intermediate its ends to said side rail on said axis, said lever having a leg extending downwardly from said axis, a slack adjuster operatively connecting the lower end of said leg to said hangers intermediate the ends thereof, said lever having another leg extending generally horizontally above said side rail in a direction toward said wheel, a power device mounted on the outboard side of the side rail and having a crank extending above the side rail and operating on an axis substantially parallel with the first-mentioned axis, and an operative connection between the crank and the adjacent end of said other leg of the lever.

5. In a railway car truck, a frame including a side rail, a wheel and axle assembly including a wheel inboardly of the side rail, a hanger pivoted on a substantially horizontal axis at its upper end from the inboard side of the side rail in radial alignment with the wheel, a brake head and shoe assembly pivoted to the lower end of the hanger, a bell-crank lever pivoted intermediate its ends on said axis and having a leg extending downwardly from the axis along said hanger and adjustably connected at its lower end to the hanger intermediate the ends thereof, said lever having another leg extending substantially horizontally alongside said side rail, a power device on the outboard side of the side rail and including a crank operating on an axis generally parallel to said first-mentioned axis and extending to the inboard side of said side rail, and an operative connection between said other leg and said crank.

6. In a railway car truck, a frame comprising a side member, a wheel and axle assembly including a wheel, a link pivoted at one end to said side member on a substantially horizontal axis extending transversely of the truck, a friction shoe assembly pivoted to the other end of said link, a bell-crank lever pivoted intermediate its ends to said member on said axis and having one leg extending vertically alongside said link and adjustably connected at its end remote from the axis to said link intermediate the ends thereof, said lever having another leg extending from said axis longitudinally of the truck, a power device carried by said member adjacent to said wheel and including a crank operating on an axis substantially parallel to said first-mentioned axis, and an operative connection between the crank and said other leg at the end thereof remote from said axis.

7. In a brake arrangement for a railway car truck, a frame comprising a side rail at its upper extremity, a wheel and axle assembly including a wheel, a pair of spaced hangers pivoted at their upper ends to said side rail on a generally horizontal axis extending axially of the wheel, a brake head and shoe assembly between the lower ends of the hangers and pivoted thereto and adapted for engagement with the tread of the wheel, a bell-crank lever pivoted intermediate its ends on said axis and having a downwardly extending leg between said hangers and adjustably connected to the hangers, said lever having another leg extending from said axis generally horizontally longitudinally of the truck, a power device mounted on the outboard side of said side rail and having a crank operating on an axis generally parallel to said first-mentioned axis, said wheel being located at one side of said side rail, and an operative connection between said crank and said other leg of said lever in radial alignment with the wheel.

8. In a brake arrangement for a railway car truck, a frame comprising a side member, a wheel and axle assembly having a wheel inboardly of said side rail, power devices on the outboard side of said side member and spaced at opposite sides of the axis of said assembly, a hanger at each side of the wheel and each pivoted at its upper end from said member on a substantially horizontal axis generally parallel to said first-mentioned axis, a friction assembly carried by the lower end of each hanger and adapted to engage the wheel at the adjacent side thereof on the tread of the wheel, a lever pivoted intermediate its ends at each side of the wheel on the same axis as the adjacent hanger and having a leg extending along the latter and connected thereto, each lever having another leg extending generally horizontally alongside said member, said levers and hanger being disposed in radial alignment with the wheel, each power device including a crank operating on an axis generally parallel to said axes, and operative connection between each crank and the last-mentioned leg of the adjacent lever, said connections being located in a radial plane substantially bisecting the wheel.

9. In a brake arrangement for a railway car truck having a frame with a side rail and a wheel and axle assembly having a wheel, a hanger pivoted at its upper end to the side rail on a substantially horizontal axis extending transversely of the truck, a friction assembly carried by the lower end of the hanger for engagement with the wheel, said hanger in applied position of the friction assembly sloping downwardly toward the wheel, a bell-crank lever pivoted intermediate its ends on said axis and having one leg extending downwardly from said axis and connected to said hanger, said lever having another leg extending from the axis toward the wheel, a power device on the side rail and comprising a crank operating on an axis substantially parallel to the first-mentioned axis, the crank arm extending away from the wheel, and an operative connection between said arm and said other leg of the lever, the disposition of said arm and lever legs and hanger serving to release said friction means from said wheel through gravity when the power device is deactivated.

10. In a brake arrangement for a railway car truck having a frame with a side rail and a wheel and axle assembly, a lever unit pivotally supported intermediate the ends thereof from the frame, said lever unit comprising portions at both ends extending between said axis and said assembly, friction means carried by one portion for engagement with the assembly, and power means operatively connected to the other portion, the arrangement of said portions and disposition of said friction means serving to effect disengagement of the friction means from the wheel by gravity when said power means is deactivated.

CARL E. TACK.
FRED E. BACHMAN.

REFERENCES CITED

The following references are of record in the file of this patent:

UNITED STATES PATENTS

| Number | Name | Date |
|---|---|---|
| 152,024 | Waldron | June 16, 1874 |
| 321,507 | Landgrane | July 7, 1885 |
| 363,319 | Crow | May 17, 1887 |
| 443,665 | Bird | Dec. 30, 1890 |
| 773,190 | Brown | Oct. 25, 1904 |
| 1,198,992 | Birch | Sept. 19, 1916 |
| 1,231,633 | Mills | July 3, 1917 |
| 1,241,147 | Plath | Sept. 25, 1917 |
| 1,542,515 | Mead | June 16, 1925 |
| 1,661,622 | Pieper | Mar. 6, 1928 |
| 1,774,527 | Sanford | Sept. 2, 1930 |
| 2,084,071 | Baselt | June 15, 1937 |
| 2,119,505 | Shaver | May 31, 1938 |
| 2,126,296 | Weike | Aug. 9, 1938 |
| 2,215,346 | Bush | Sept 17, 1940 |
| 2,352,222 | Pogue et al. | June 27, 1944 |

FOREIGN PATENTS

| Number | Country | Date |
|---|---|---|
| 739,404 | France | Oct. 25, 1932 |